(12) United States Patent
Su et al.

(10) Patent No.: US 8,609,755 B2
(45) Date of Patent: *Dec. 17, 2013

(54) STORAGE STABLE COMPOSITION OF PARTIAL AND/OR COMPLETE CONDENSATE OF HYDROLYZABLE ORGANOFUNCTIONAL SILANE

(75) Inventors: Shiu-Chin (Cindy) H. Su, Croton-on-Hudson, NY (US); Kendall L. Guyer, Carmel, NY (US); Jeffrey I. Melzer, Lansdale, PA (US); Christopher M. Carter, Gulfport, MS (US); Matthew M. Hunter, Langhorne, PA (US); Andrea Keys Eodice, Manville, NJ (US); Donald W. Whisenhunt, Jr., Niskayuna, NY (US); Lingyun He, Niskayuna, NY (US); Bret Chisholm, West Fargo, ND (US)

(73) Assignee: Momentive Perfomance Materials Inc., Waterford, NY (US)

( * ) Notice: Subject to any disclaimer, the term of this patent is extended or adjusted under 35 U.S.C. 154(b) by 785 days.

This patent is subject to a terminal disclaimer.

(21) Appl. No.: 11/541,333

(22) Filed: Sep. 29, 2006

(65) Prior Publication Data

US 2007/0090329 A1 Apr. 26, 2007

Related U.S. Application Data

(63) Continuation-in-part of application No. 11/290,064, filed on Nov. 30, 2005.

(60) Provisional application No. 60/669,123, filed on Apr. 7, 2005.

(51) Int. Cl.
*C08G 18/26* (2006.01)
*C09K 3/00* (2006.01)

(52) U.S. Cl.
USPC ............... 524/198; 524/81; 252/387; 528/10

(58) Field of Classification Search
USPC ........... 524/843, 188, 81, 198; 523/200, 212, 523/213; 252/387; 528/10
See application file for complete search history.

(56) References Cited

U.S. PATENT DOCUMENTS

| | | | |
|---|---|---|---|
| 4,042,749 A | 8/1977 | Sandvig | |
| 4,075,153 A | 2/1978 | Leo | |
| 4,171,297 A | 10/1979 | Hosaka et al. | |
| 4,311,738 A | 1/1982 | Chi | |
| 4,379,196 A | 4/1983 | Halper | |
| 4,411,964 A | 10/1983 | Hara et al. | |
| 4,465,846 A | 8/1984 | Bremer | |
| 4,495,247 A | 1/1985 | Vasta | |
| 4,514,315 A | 4/1985 | Matulewicz | |
| 4,579,752 A | 4/1986 | Dubois et al. | |
| 4,618,688 A | 10/1986 | DePasquale et al. | |
| 4,775,600 A | 10/1988 | Adaniya et al. | |
| 4,799,963 A | 1/1989 | Basil et al. | |
| 4,889,775 A | 12/1989 | Adaniya et al. | |
| 5,035,745 A | 7/1991 | Lin et al. | |
| 5,049,596 A | 9/1991 | Fujimoto et al. | |
| 5,108,793 A | 4/1992 | van Ooij et al. | |
| 5,141,575 A | 8/1992 | Yoshitake et al. | |
| 5,164,003 A | 11/1992 | Bosco et al. | |
| 5,192,374 A | 3/1993 | Kindler | |
| 5,194,138 A | 3/1993 | Mansfeld et al. | |
| 5,200,275 A | 4/1993 | Van Ooij et al. | |
| 5,206,285 A | 4/1993 | Castellucci | |
| 5,209,788 A | 5/1993 | McMillen et al. | |
| 5,221,371 A | 6/1993 | Miller | |
| 5,258,522 A | 11/1993 | Tsuchida et al. | |
| 5,270,428 A | 12/1993 | Castellucci | |
| 5,292,549 A | 3/1994 | Van Ooij et al. | |
| 5,319,040 A | 6/1994 | Wengrovius et al. | |
| 5,322,713 A | 6/1994 | Van Ooij et al. | |
| 5,324,806 A | 6/1994 | Wengrovius et al. | |
| 5,326,594 A | 7/1994 | Sabata et al. | |
| 5,336,748 A | 8/1994 | Castellucci | |
| 5,344,712 A | 9/1994 | Basil et al. | |
| 5,356,492 A | 10/1994 | Miller | |
| 5,362,335 A | 11/1994 | Rungta | |
| 5,366,567 A | 11/1994 | Ogino et al. | |
| 5,393,353 A | 2/1995 | Bishop | |
| 5,399,210 A | 3/1995 | Miller | |
| 5,419,790 A | 5/1995 | Miller | |
| 5,426,131 A | 6/1995 | Katsamberis | |
| 5,433,976 A | 7/1995 | Van Ooij et al. | |
| 5,437,937 A | 8/1995 | Cayless | |
| 5,451,431 A | 9/1995 | Purnell et al. | |
| 5,476,896 A * | 12/1995 | Pereira et al. | 524/524 |
| 5,478,655 A | 12/1995 | Sabata et al. | |
| 5,531,820 A | 7/1996 | Gorecki | |
| 5,548,053 A | 8/1996 | Weidner et al. | |
| 5,658,976 A | 8/1997 | Carpenter et al. | |
| 5,668,212 A | 9/1997 | Naito | |
| 5,708,048 A | 1/1998 | Medford et al. | |
| 5,730,246 A | 3/1998 | Beard | |
| 5,750,197 A | 5/1998 | Van Ooij et al. | |
| 5,756,218 A | 5/1998 | Buchheit et al. | |
| 5,759,629 A | 6/1998 | Van Ooij et al. | |

(Continued)

FOREIGN PATENT DOCUMENTS

| | | |
|---|---|---|
| CN | 1332213 | 1/2002 |
| CN | 1353744 | 6/2002 |

(Continued)

OTHER PUBLICATIONS

Machine Translation of JP 2000-290536.*

(Continued)

*Primary Examiner* — Hannah Pak
(74) *Attorney, Agent, or Firm* — Dominick G. Vicari; Joseph S. Ostroff

(57) ABSTRACT

Conversion and passivation coatings and methods for treating metal surfaces such as steel and aluminum are disclosed. The coating compositions comprise a silane and a stabilizing agent. The methods herein comprise contacting the requisite metal surface with the coating composition.

23 Claims, No Drawings

(56) References Cited

U.S. PATENT DOCUMENTS

| | | | |
|---|---|---|---|
| 5,796,117 A | 8/1998 | Larson et al. | |
| 5,814,137 A | 9/1998 | Biohowiak et al. | |
| 5,817,160 A | 10/1998 | Nagpal et al. | |
| 5,846,342 A | 12/1998 | Aoyama et al. | |
| 5,866,652 A | 2/1999 | Hager et al. | |
| 5,868,819 A | 2/1999 | Guhde et al. | |
| 5,869,141 A | 2/1999 | Biohowiak et al. | |
| 5,879,437 A * | 3/1999 | Hartman | 106/14.44 |
| 5,916,355 A | 6/1999 | Willis et al. | |
| 5,938,861 A | 8/1999 | Inoue et al. | |
| 5,964,928 A | 10/1999 | Tomlinson | |
| 5,990,188 A | 11/1999 | Patel et al. | |
| 6,071,566 A | 6/2000 | Brown et al. | |
| 6,077,885 A | 6/2000 | Hager et al. | |
| 6,106,901 A * | 8/2000 | Song et al. | 427/387 |
| 6,126,997 A | 10/2000 | Rivera et al. | |
| 6,132,808 A | 10/2000 | Brown et al. | |
| 6,162,498 A | 12/2000 | Mennig et al. | |
| 6,162,547 A | 12/2000 | Van Ooji et al. | |
| 6,180,177 B1 | 1/2001 | Nagashima et al. | |
| 6,180,696 B1 | 1/2001 | Wong et al. | |
| 6,214,473 B1 | 4/2001 | Hunt et al. | |
| 6,215,011 B1 | 4/2001 | Bishop | |
| 6,224,944 B1 | 5/2001 | Tokarz et al. | |
| 6,251,989 B1 | 6/2001 | Edelmann et al. | |
| 6,261,638 B1 | 7/2001 | Van Ooij et al. | |
| 6,270,884 B1 | 8/2001 | Guhde et al. | |
| 6,281,275 B1 | 8/2001 | Sanduja et al. | |
| 6,312,812 B1 | 11/2001 | Hauser et al. | |
| 6,361,592 B1 | 3/2002 | Song et al. | |
| 6,395,856 B1 | 5/2002 | Petty et al. | |
| 6,403,164 B1 | 6/2002 | Jonschker et al. | |
| 6,406,652 B1 | 6/2002 | Protz et al. | |
| 6,416,869 B1 | 7/2002 | Van Ooij et al. | |
| 6,416,870 B1 | 7/2002 | Hunt et al. | |
| 6,432,191 B2 | 8/2002 | Schutt | |
| 6,440,541 B1 | 8/2002 | Humphrey et al. | |
| 6,447,589 B2 | 9/2002 | Sasaki et al. | |
| 6,451,382 B2 | 9/2002 | Schutt et al. | |
| 6,451,443 B1 | 9/2002 | Daech | |
| 6,461,682 B1 | 10/2002 | Crotty et al. | |
| 6,478,886 B1 | 11/2002 | Kunz et al. | |
| 6,482,274 B2 | 11/2002 | Shimakura et al. | |
| 6,500,276 B1 | 12/2002 | Minevski et al. | |
| 6,503,565 B1 | 1/2003 | Hughes et al. | |
| 6,506,314 B1 | 1/2003 | Whitney, Jr. et al. | |
| 6,528,468 B2 | 3/2003 | Matsukawa et al. | |
| 6,534,568 B1 * | 3/2003 | Katz et al. | 523/212 |
| 6,562,474 B1 | 5/2003 | Yoshimi et al. | |
| 6,579,472 B2 | 6/2003 | Chung et al. | |
| 6,596,835 B1 | 7/2003 | Brown et al. | |
| 6,638,369 B1 | 10/2003 | Tucker et al. | |
| 6,695,904 B2 | 2/2004 | Burger et al. | |
| 6,827,981 B2 * | 12/2004 | van Ooij et al. | 427/387 |
| 6,875,479 B2 * | 4/2005 | Jung et al. | 427/493 |
| 6,953,821 B2 * | 10/2005 | Tamori et al. | 524/457 |
| 7,202,309 B2 | 4/2007 | Furrer et al. | |
| 2002/0084002 A1 | 7/2002 | Hardin et al. | |
| 2002/0096230 A1 | 7/2002 | Hardin et al. | |
| 2003/0026912 A1 | 2/2003 | Ostrovsky | |
| 2003/0027011 A1 | 2/2003 | Kotov et al. | |
| 2003/0041779 A1 | 3/2003 | Burger | |
| 2003/0049486 A1 | 3/2003 | Ooij et al. | |
| 2003/0165627 A1 | 9/2003 | Heimann et al. | |
| 2004/0009300 A1 | 1/2004 | Shimakura et al. | |
| 2004/0018367 A1 * | 1/2004 | Jaworek et al. | 428/457 |
| 2004/0062873 A1 | 4/2004 | Jung et al. | |
| 2004/0139887 A1 | 7/2004 | Zhang | |
| 2005/0059783 A1 | 3/2005 | Furrer et al. | |
| 2005/0079364 A1 | 4/2005 | Van Ooij et al. | |
| 2005/0084616 A1 | 4/2005 | Rivera et al. | |
| 2005/0131106 A1 | 6/2005 | Tonapi et al. | |
| 2005/0179010 A1 | 8/2005 | Lin | |
| 2006/0009549 A1 | 1/2006 | Legters et al. | |
| 2006/0036034 A1 | 2/2006 | Chaves et al. | |
| 2006/0042509 A1 | 3/2006 | Henglein et al. | |
| 2006/0070551 A1 | 4/2006 | Kanamori et al. | |
| 2006/0090818 A1 | 5/2006 | Carey | |
| 2006/0127681 A1 | 6/2006 | Domes et al. | |
| 2006/0134339 A1 | 6/2006 | Wang et al. | |
| 2006/0147674 A1 | 7/2006 | Walker | |
| 2006/0167154 A1 * | 7/2006 | Bousseau et al. | 524/403 |
| 2006/0177657 A1 | 8/2006 | Weller | |
| 2006/0228470 A1 | 10/2006 | He et al. | |
| 2009/0032140 A1 | 2/2009 | Carey et al. | |
| 2010/0178521 A1 * | 7/2010 | Byrne et al. | 428/450 |
| 2011/0086173 A1 | 4/2011 | Walter et al. | |

FOREIGN PATENT DOCUMENTS

| | | |
|---|---|---|
| CN | 1530462 | 9/2004 |
| DE | 198 13 709 A1 | 9/1999 |
| DE | 198 14 605 A1 | 10/1999 |
| EP | 1342893 A2 | 1/1974 |
| EP | 0089810 B1 | 9/1983 |
| EP | 0157044 A1 | 10/1985 |
| EP | 0263428 B2 | 4/1988 |
| EP | 0358338 B1 | 8/1989 |
| EP | 0337075 B1 | 10/1989 |
| EP | 0367504 B1 | 5/1990 |
| EP | 0385736 | 9/1990 |
| EP | 0465918 B1 | 1/1992 |
| EP | 0486778 B1 | 5/1992 |
| EP | 1130132 | 9/2001 |
| JP | 57128752 | 8/1982 |
| JP | 05-209088 A | 8/1993 |
| JP | 2000-290536 | 10/2000 |
| JP | 2004/352699 | 12/2004 |
| JP | 2006519307 | 8/2006 |
| WO | WO 88/06639 A1 | 9/1988 |
| WO | WO 91/14662 A1 | 10/1991 |
| WO | WO 95/08008 A1 | 3/1995 |
| WO | WO 96/11290 A1 | 4/1996 |
| WO | WO 99/14399 A1 | 3/1999 |
| WO | WO 00/39177 A2 | 7/2000 |
| WO | WO 00/39356 A1 | 7/2000 |
| WO | WO 00/46310 A1 | 8/2000 |
| WO | WO 00/46311 A1 | 8/2000 |
| WO | WO 00/46312 A1 | 8/2000 |
| WO | WO 00/63303 A1 | 10/2000 |
| WO | WO 00/63462 A1 | 10/2000 |
| WO | WO 01/05520 A2 | 1/2001 |
| WO | WO 01/06036 A1 | 1/2001 |
| WO | WO 01/07679 A1 | 2/2001 |
| WO | WO 01/36331 A1 | 5/2001 |
| WO | WO 01/38225 A1 | 5/2001 |
| WO | WO01/98403 A2 | 5/2001 |
| WO | WO01/46320 | 6/2001 |
| WO | WO 01/46495 A2 | 6/2001 |
| WO | WO 01/55029 A1 | 8/2001 |
| WO | WO 02/14586 A1 | 2/2002 |
| WO | WO 02/31063 A1 | 4/2002 |
| WO | WO2004/018579 | 3/2004 |
| WO | 2004076717 | 9/2004 |
| WO | WO2004076568 | 9/2004 |
| WO | WO2004076718 | 9/2004 |
| WO | WO2005/021647 | 3/2005 |
| WO | WO 2006/110328 A1 | 10/2006 |

OTHER PUBLICATIONS

International Search Report dated May 19, 2008.

S.L. Su, K.L. Guyer and A.S. Borovik, "Water-Borne Silane Conversion Coating for Replacement of Phosphate/Chromate Pretreatments", GE Advanced Materials, 7 pages.

R. Zandi-zand, A. Erchad-Iangroucli, A. Rahimi, "Silica Based Organic-Inorganic Hybrid Nanocomposite Coatings for Corrosion Protection", Progress in Organic Coatings 53 (2005) 286-291.

Tammy L Metroke, Allen Apblett, "Effect of Solvent Dilution of Corrosion Protective Properties of Ormosil Coatings on 2024-T3 Aluminum Alloy", Progress in Organic Coatings 51 (2004) 36-46.

M.F. Montemor, A.M. Simoes, M.G.S. Ferreira, "Composition and Corrosion Behaviour of Galvanised Steel Treated with Rare-Earth

(56) References Cited

OTHER PUBLICATIONS

Salts: The Effect of the Cation", Progress in Organic Coatings 44 (2002) 111-120.

Danping Zhu, Wo J. van Ooij, "Corrosion Protection of Metals by Water-Based Silane Mixtures of Bis-[Trimethoxysilylpropyl]amine and vinyltnacetoxysilane", Progress in Organic Coatings 49 (2004) 42-53.

Vignesh Palanivel, Danqing Zhu, Wim J. van Ooij "Nanoparticle-Filled Silane Films as Chromate Replacements for Aluminum Alloys", Progress in Organic Coatings 47 (2003) 384-392.

\* cited by examiner

STORAGE STABLE COMPOSITION OF PARTIAL AND/OR COMPLETE CONDENSATE OF HYDROLYZABLE ORGANOFUNCTIONAL SILANE

CROSS REFERENCE TO RELATED APPLICATIONS

This application is a continuation-in-part of U.S. patent application Ser. No. 11/290,064 filed Nov. 30, 2005, which claims the priority benefit of U.S. Provisional Patent Application Ser. No. 60/669,123 filed Apr. 7, 2005 both of which are hereby incorporated by reference herein in their entireties.

BACKGROUND OF THE INVENTION

1) Field of the Invention

This disclosure relates to non-chromium containing coatings for metals. Particularly, the disclosure relates to a no-rinse, non-chromate, non-metal phosphate coating for steel, zinc coated steel, and aluminum surfaces comprising a stabilizing agent to improve the adhesion of siccative, conversion and/or passivation coatings to the surface and provide enhanced corrosion protection.

2) Description of Related Art

A variety of compositions are known for commercial applications to prepare metal surfaces. For example, chromium compounds and heavy metal phosphate conversion coatings are used in commercial applications to prepare metal surfaces prior to painting operations. However, growing concerns exist regarding the toxicity profile of chromium and the pollution effects of chromates, phosphates, and other heavy metals discharged into rivers and waterways from the waste streams of these industrial processes.

Accordingly, there is a need in the art to provide an effective treatment free of chromium compounds or heavy metal phosphates to provide dried in place conversion or passivation coatings to inhibit metal surface corrosion and enhance place conversion or passivation coatings to inhibit metal surface corrosion and enhance the adhesion of paint or other coatings that may be applied to the surface. The U.S. Pat. No. 5,433,976 describes an alkaline solution made from a combination of inorganic silicate or aluminate, an organofunctional silane and a non-functional silane as a treatment for metal that provides enhanced corrosion resistance of painted metal substrates. U.S. Pat. No. 6,106,901 discloses a method to treat a metal with a solution comprised of a ureido silane with one or more multi-silyl-functional silanes. A solvent such as an alcohol may be included to improve the solubility or stability and an acid may be added to adjust the pH of the solution below 7. The solvent may be substantially removed in a subsequent step.

BRIEF DESCRIPTION OF THE INVENTION

The present disclosure pertains to a method(s) and composition(s) for treating the surfaces of a metal such as steel, (specifically in one embodiment cold-rolled steel), zinc coated steels, and aluminum, to provide for the formation of a conversion or passivation coating, which increases the corrosion resistance of bare or painted metal and/or the adhesion properties between the metal and the coating. In one embodiment, the methods herein comprise contacting the requisite metal surface with a stabilized, aqueous sol comprising colloidal oxide particles such as metal oxide or silica particles and a ureido silane compound. After contact of the metal surface with the above treatment (also known as pretreatment or pretreatment solution, treatment composition, aqueous composition, aqueous pretreatment composition, aqueous sol composition, low HAPS composition, composition, stabilized aqueous sol composition, low volatiles composition and the like), the treatment may be dried in place to form the desired coating. Specifically, the treatment is substantially free of chromium and phosphate.

In one embodiment herein there is provided a stable composition comprising:
a) an aqueous solution of partial and/or complete condensate of organofunctional silane susceptible to gel formation and/or precipitation and substantially free of hazardous air pollutant, wherein said aqueous solution is not stable; and,
b) a stability-increasing amount of stabilizing agent, that stabilizes aqueous solution (a) to produce the stable composition.

In one other embodiment herein there is provided a composition comprising (a) the partial or complete condensate of ureidosilane (b) colloidal oxide and (c) water.

In yet another embodiment herein there is provided a method for treating a metal surface to form a conversion or passivation coating thereon which comprises contacting said metal surface with a stable composition comprising:
a) an aqueous solution of partial and/or complete condensate of organofunctional silane susceptible to gel formation and/or precipitation and substantially free of hazardous air pollutant, wherein said aqueous solution is not stable; and,
b) a stability-increasing amount of stabilizing agent, that stabilizes aqueous solution (a) to produce the stable composition.

In yet a further embodiment there is provided a method of treating a metal surface to form a conversion or passivation coating thereon which comprises contacting said metal surface with a composition comprising:
a) a partial or complete condensate of ureidosilane;
b) a colloidal metal oxide or silica particles; water; and,
c) optionally, an adjuvant which is an alkoxysilane compound different from ureidoalkoxysilane (a).

DETAILED DESCRIPTION OF THE INVENTION

In accordance with an embodiment herein, it has been discovered that chrome-free, and specifically phosphate free, conversion or passivation coatings can be provided on metal surfaces such as electrogalvanized steel, cold rolled steel, hot dip galvanized steel, aluminum, and other metals by contacting the desired surface with a stabilized aqueous sol such as a metal oxide sol and/or optionally, a silica sol.

In one specific embodiment herein, it will be understood that all ranges herein comprise can comprise all ranges therebetween.

In one specific embodiment herein there is provided a stable composition for treating a metal surface to form a conversion or passivation coating thereon, said composition comprising:
a) an aqueous solution of partial and/or complete condensate of organofunctional silane susceptible to gel formation and/or precipitation and substantially free of hazardous air pollutant, wherein said aqueous solution is not stable; and
b) a stability-increasing amount of stabilizing agent, that stabilizes aqueous solution (a);
c) colloidal oxide; and,
d) optionally, an adjuvant which is an alkoxysilane different from organofunctional silane (a), wherein said composition is a stable composition.

In a further embodiment herein the compositions described herein can be treatment compositions for treating a metal surface to form a conversion or passivation coating thereon. In a yet further embodiment the method described herein of treating a metal surface to form a conversion or passivation coating thereon which comprises contacting said metal surface with a composition, can comprise contacting said metal surface with a treatment composition.

The aqueous sol compositions further comprise one or more hydrolyzed or partially hydrolyzed silanes such as the non-limiting example of ureido silanes. In a more specific embodiment, stabilizing agent(s) is/are added to the sol-silane mixture (aqueous solution) to enhance product stability. In one embodiment herein, aqueous pretreatment compositions described herein, provide improved corrosion resistance of bare and painted metal, and adhesion of applied coatings to bare and painted metal. It will be understood herein that the phrase "bare metal" refers to metal surfaces that are treated with the conversion or passivation coating described herein but which have not been painted.

In one embodiment herein the phrase "organofunctional silane" is understood to be any alkoxysilane and/or acyloxysilane that in addition to its alkoxy or acyloxy functionality has an additional organic functionality other than amino.

In one embodiment herein, it will be understood herein that the phrase partial and/or complete condensate of organofunctional silane, or more specifically, a partial and/or complete condensate of ureidoalkoxysilane can comprise a organofunctional silane and/or ureidoalkoxysilane as well as optionally partial or complete hydrolyzates thereof, as well as partial and/or complete condensates of said hydrolyzates. In one embodiment herein it will be understood that ureidoalkoxysilane is a more specific embodiment of an organofunctional silane, which can be used in any embodiment herein. In one embodiment herein, in any of the compositions and/or methods described herein, ureidosilane can be, in one non-limiting embodiment, an organofunctional silane. In one embodiment an organofunctional silane is an alkoxysilane and/or acyloxysilane that can be hydrolyzed with any water, specifically water present in any compositions and/or methods described herein to yield the presence of partial and/or complete condensates of organofunctional silane in said compositions and/ or methods. In yet another embodiment a hydrolyzate is the partial and/or completely hydrolyzed product of organofunctional silane. In another further embodiment, similar to the hydrolysis of organofunctional silane described herein, hydrolyzate can be subject to a condensation reaction that can involve condensation reactions known to those skilled in the art that can yield partially and/or completely condensed hydrolyzates. In another embodiment herein, the level of hydrolysis of the herein described organofunctional silane can be the amount that occurs instantly upon exposure of the silane to moisture up to complete hydrolysis of the organofunctional silane.

In one embodiment herein, organofunctional silane (a) is of the general formula (I):

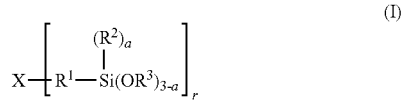

(I)

wherein each occurrence of $R^1$ is independently a linear, branched or cyclic divalent organic group of 1 to about 12 carbon atoms, more specifically 1 to about 10 carbon atoms, and most specifically from 1 to about 8 carbon atoms, such as the non-limiting examples of methylene, ethylene, propylene, isopropylene, butylene, isobutylene, cyclohexylene, arylene or alkarylene forming a stable bridge between organofunctional group X and the silyl group, and optionally containing one or more heteroatoms, such as the non-limiting examples of O and S; each occurrence of $R^2$ independently is alkyl, alkoxy-substituted alkyl, aryl, or aralkyl, all of specifically from 1 to about 16 carbon atoms, more specifically from 1 to about 12 carbon atoms and most specifically from 1 to about 8 carbon atoms, each $R^3$ independently is hydrogen, acetyl, alkyl, or alkoxy-substituted alkyl, all of specifically from 1 to about 16 carbon atoms, more specifically from 1 to about 12 carbon atoms and most specifically up to about 8 carbon atoms X is an organofunctional group; of valence r, including mono-, di- or polyvalent functional groups, r is an integer of 1 to 4, and a is an integer of from 0 to 2, more specifically 0 to 1 and most specifically 0.

In one embodiment X is a functional group, such as the non-limiting examples of mercapto, acyloxy, glycidoxy, epoxy, epoxycyclohexyl, epoxycyclohexylethyl, hydroxy, episulfide, acrylate, methacrylate, ureido, thioureido, vinyl, allyl, —NHCOOR$^5$ or —NHCOSR$^5$ where $R^5$ is a monovalent hydrocarbyl group containing from 1 to about 12 carbon atoms, more specifically from 1 to about 8 carbon atoms, thiocarbamate, dithiocarbamate, ether, thioether, disulfide, trisulfide, tetrasulfide, pentasulfide, hexasulfide, polysulfide, xanthate, trithiocarbonate, dithiocarbonate, isocyanurato, or another —Si($R^2$)$_a$(OR$^3$)$_{3-a}$ group wherein $R^2$, $R^3$ and a are as defined.

In one embodiment the set of univalent organofunctional groups herein includes, but is not limited to, mercapto; acyloxy, such as acryloxy, methacryloxy, and acetoxy; glycidoxy, —O—CH$_2$—C$_2$H$_3$O; epoxycyclohexylethyl, —CH$_2$—CH$_2$—C$_6$H$_9$O; epoxycyclohexyl, —C$_6$H$_9$O; epoxy, —CR (—O—)CR$_2$; hydroxy; carbamate, —NR(C=O)OR; urethane, —O(C=O)NRR; univalent ureido —NR(C=O)NR$_2$; silyl, —Si($R^2$)$_a$(OR$^3$)$_{3-a}$; where a is as defined; silylalkyl, —C$_6$H$_9$(C$_2$H$_4$Si($R^2$)$_a$(OR$^3$)$_{3-a}$)$_2$, where a is as defined, wherein C$_6$H$_9$ refers to cyclohexyl; and univalent isocyanurato (—N)(NR)(NR)C$_3$O$_3$ where each occurrence of R is independently selected from the group consisting of hydrogen, alkyl of from 1 to 6 carbon atoms, cycloalkyl, alkenyl of from 1 to 6 carbon atoms, arylene or alkarylene.

In another embodiment herein the set of divalent organofunctional groups herein includes, but is not limited to, carbamate, —(—)N(C=O)OR; ureido —NR(C=O)NR—; and divalent isocyanurato, (—N)$_2$(NR)C$_3$O$_3$ where R is independently selected from the group of hydrogen, alkyl of from 1 to 6 carbon atoms, cycloalkyl, alkenyl of from 1 to 6 carbon atoms, arylene or alkarylene.

In yet another embodiment herein, the set of trivalent organofunctional groups herein includes, but is not limited to, carbamate, (—)$_2$NC(=O)O—; ureido, (—)$_2$NC(=O)NR—, and trivalent isocyanurato (—N)$_3$C$_3$O$_3$, wherein each occurrence of R is independently selected from the group comprising hydrogen, alkyl of from 1 to 6 carbon atoms, cycloalkyl, alkenyl of from 1 to 6 carbon atoms, arylene or alkarylene.

In a further embodiment herein, the set of quadrivalent organofunctional groups herein includes, but is not limited to ureido, (—)$_2$N(C=O)N(—)$_2$.

In a specific embodiment the organofunctional silane is univalent ureido —NR(C=O)NR$_2$; divalent ureido —NR(C=O)NR— and (—)$_2$N(C=O)NR$_2$; trivalent ureido (—)$_2$NC(=O)NR—; tetravalent ureido (—)$_2$N(C=O)N(—)$_2$ and trivalent isocyanurato (—N)$_3$C$_3$O$_3$.

In a specific embodiment r is an integer of from 1 to 4 and specifically from 2 to 4, and more specifically 3 to 4.

In one embodiment organofunctional silane (a) is a ureidoalkoxysilane such as the non-limiting example of ureidoalkoxysilane (a) described above. In one more specific embodiment herein, as to the ureido silane (such as the non-limiting example of ureidoalkoxysilane (a) described above) materials that are present and can be used, these include ureido silanes as set forth in Formula (II).

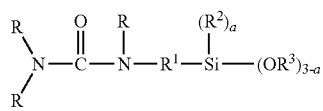

wherein each occurrence of R independently is hydrogen, alkyl of from 1 to 6 carbon atoms, cycloalkyl, alkenyl of from 1 to 6 carbon atoms, arylene or alkarylene, and specifically the R which is bound to the nitrogen atom that is a bridge between the carbonyl and $R^1$, is individually selected from the group consisting of hydrogen, methyl, ethyl, propyl, isopropyl, butyl, iso-butyl, sec-butyl, tert-butyl, and cyclohexyl; $R^1$ is a substituted or unsubstituted aliphatic or aromatic group, specifically $R^1$ is selected from the members of the group consisting of an alkylene of from 1 to 10 carbon atoms, alkenylene of 1 to 6 carbon atoms, arylene and alkylarylene and some non-limiting examples of $R^1$ are methylene, ethylene, propylene, 2-methylpropylene and 2,2-dimethylbutylene; each $R^2$ independently is a monovalent hydrocarbon group from 1 to 10 carbon atoms, more specifically 1 to about 6 carbon atoms, specifically such as the non-limiting examples of alkyl, aryl and aralkyl groups such as the non-limiting examples of methyl, ethyl, butyl, hexyl, phenyl, or benzyl, more specifically, the lower alkyls of from 1 to 4 carbon atoms and most specifically methyl; and $R^3$ each is independently chosen from the group consisting of hydrogen, linear or branched alkyl, linear or branched alkoxy-substituted alkyl, linear or branched acyl, specifically $R^3$ is individually chosen from the group consisting of hydrogen, ethyl, methyl, propyl, iso-propyl, butyl, iso-butyl, sec-butyl and acetyl; and in one embodiment, at least one $R^3$ is other than hydrogen or acetyl; and a is 0, 1 or 2.

In one specific embodiment, it will be understood herein that as used herein, the term "substituted" aliphatic or aromatic means an aliphatic or aromatic group wherein the carbon backbone may have a heteroatom located within the backbone, or a heteroatom, or a heteroatom containing group attached to the carbon backbone. In one embodiment some non-limiting examples of a heteroatom are oxygen, nitrogen or combinations thereof.

In one other more specific embodiment herein, ureido silane (such as the non-limiting example of ureidoalkoxysilane) employed in this disclosure is γ-ureidopropyltrimethoxysilane such as one having the structure (III):

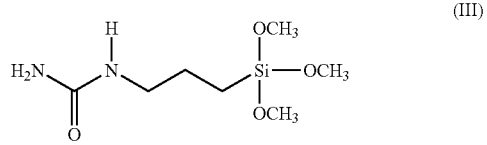

In another specific embodiment one non-limiting example of ureido silane herein can be 3-ureidopropyltriethoxysilane which can also be used to prepare the hydrolyzates, which can be used in the compositions and methods described herein.

Pure 3-ureidopropyltriethoxysilane is a waxy solid material. A solvent or means of solubilizing the solid material is needed for it to be useful. In one specific embodiment herein, commercially available 3-ureidopropyltriethoxysilane is dissolved in the non-limiting example of methanol, and as a result, it is not a pure compound but contains both methoxy and ethoxy groups attached to the same silicon atom. In one embodiment commercially available 3-ureidopropyltriethoxysilane is dissolved in methanol so that methanol makes up 50 weight percent solution of the solution of ureidopropyltrialkoxysilane and methanol. In another specific embodiment herein, when fully hydrolyzed, the identity of the silanes would be identical.

In one embodiment herein organofunctional silane (a) is selected from the group consisting of vinylmethyldiethoxysilane, vinyltrimethoxysilane, vinyldimethylethoxysilane, vinyltriethoxysilane, vinyltripropoxysilane, vinyl-tris(2-methoxyethoxysilane), styrylethyltrimethoxysilane, gamma-acryloxypropyltrimethoxysilane, gamma-(acryloxypropyl)methyldimethoxysilane, gamma-methacryloxypropyltrimethoxysilane, gamma-methacryloxypropyltriethoxysilane, gamma-methacryloxypropylmethyldimethoxysilane, gamma-methacryloxypropylmethyldiethoxysilane, gamma-methacryloxypropyl-tris-(2-methoxyethoxy)silane, beta-(3,4-epoxycyclohexyl)ethyltrinmethoxysilane, beta-(3,4-epoxycyclohexyl)ethyltriethoxysilane, gamma-glycidoxypropyltrimethoxysilane, gamma-glycidoxypropyltriethoxysilane, gamma-glycidoxypropylmethyldiethoxysilane, gamma-glycidoxypropylmethyldimethoxysilane, gamma-mercaptopropyltrimethoxysilane, gamma-mercaptopropyltriethoxysilane, gamma-thiooctanoylpropyltrimethoxysilane, gamma-thiooctanoylpropyltriethoxysilane, bis-(trimethoxysilylpropyl)tetrasulfane, bis-(triethoxysilylpropyl)disulfane, gamma-ureidopropyltrimethoxysilane, gamma-ureidopropyltriethoxysilane, gamma-ureidopropyldimethoxyethoxysilane, gamma-ureidopropylnethoxydiethoxysilane, gamma-ureidopropylmethyldimethoxysilane, gamma-ureidopropylmethyldiethoxysilane, gamma-ureidopropylmethyhnethoxyethoxysilane, gamma-carbamatopropyltrimethoxysilane, gamma-carbamatopropyltriethoxysilane, isocyanurate propyltrimethoxysilane, bis-(trimethoxysilylpropyl)urea, bis-(triethoxysilylpropyl)urea, 2-cyanoethyltrimethoxysilane, 2-cyanoethyltriethoxysilane and combinations thereof.

In one specific embodiment organofunctional silane (a) is selected from the group consisting of gamma-ureidopropyl-trimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane, N,N'-bis-(3-triethoxysilylpropyl)urea, N,N'-bis-(3-trimethoxysilylpropyl)urea, N,N'-bis-(3-diethoxymethylsilylpropyl)urea, N,N'-bis-(3-diisopropoxymethylsilylpropyl)urea, N,N-bis-(3-triethoxysilylpropyl)urea, N,N-bis-(3-trimethoxysilylpropyl)urea, N,N-bis-(3-diethoxymethylsilylpropyl)urea, N,N-bis-(3-diisopropoxysilylpropyl)urea, N,N,N'-tris-(3-triethoxysilylpropyl)urea, N,N,N'-tris-(3-trimethoxysilylpropyl)urea, N,N,N'-tris-(3-diethoxymethylsilylpropyl)urea, N,N,N'-tris-(3-diisopropoxysilylpropyl)urea, N,N,N,'N'-tetrakis-(3- triethoxysilylpropyl)urea, N,N,N,'N'-tetrakis-(3-trimethoxysilylpropyl)urea, N,N,N,'N'-tetrakis-(3-diethoxymethylsilylpropyl)urea, N,N,N,'N'-tetrakis-(3-diisopropoxymethylsilylpropyl)urea, tris-(3-trimethoxysilylpropyl)isocyanurate, and combinations thereof.

In one other embodiment herein the phrase "substantially free of hazardous air pollutant" (HAP or HAPs) is a level of HAP that is present after a removal of HAP from the aqueous solution of partial and/or complete condensate of organofunctional silane described above, more specifically a removal that results in a lower level of HAP compared to an equivalent aqueous solution of partial and/or complete condensate of organofunctional silane that has not had HAP removed. In one specific embodiment, such a removal of HAP can be accomplished through sparging with an inert gas such as the non-limiting example of nitrogen. In one more specific embodiment such sparging can be conducted for a period of from about 2 to about 96 hours, more specifically of from about 4 to about 72 hours, even more specifically of from about 6 to about 48 hours and most specifically of from about 8 to about 24 hours. In another embodiment herein some other techniques that can be used herein for the removal of HAP are reduced pressure and/or distillation. In one even more specific embodiment "substantially free of hazardous air pollutant" can comprise a level of HAP of specifically less than about 1 weight percent, more specifically less than about 0.2 weight percent, even more specifically less than about 0.05 weight percent and most specifically less than about 0.01 weight percent, said weight percents being based on the total weight of the composition.

In one specific embodiment herein HAP are any compounds used in paints that have been identified as HAPs in the Clean Air Act Amendments of 1990. In one specific embodiment HAP can be byproducts formed from the hydrolysis of organofunctional silane (a) described above. In one specific embodiment HAP include acetamide, acrylamide, acrylic acid, acrylonitrile, allyl chloride, aniline, benzene, 1,3-butadiene, caprolactam, catechol, cumene, 1,2-dichloroethane, dichloroethyl ether, diethanolamine, dimethylamino-azobenzene, dimethylfomamide, dimethylphthalate, epichlorohydrin, ethyl acrylate, ethyl benzene, ethylene dibromide, ethylenimine, formaldehyde, hexachlorabenzene, n-hexane, hydroquinone, isophorone, maleic anhydride, methanol, methyl ethyl ketone, methyl isobutyl ketone, methylene chloride, naphthalene, nitrobenzene, 2-nitropropane, pentachlorophenol, phenol, propylene oxide, styrene, 1,1,2,2-tetrachloroethane, toluene, 2,4-toluene diisocyanate, 1,1,1-trichloroethane, trichloroethylene, 2,4,6-trichlorophenol, vinyl acetate, vinyl chloride, xylenes, m-xylene, o-xylene, p-xylene and combinations thereof. An example is the release of methanol from the hydrolysis of gamma-ureidopropyltrimethoxysilanes.

In another specific embodiment in addition to being substantially free of HAPS, the aqueous solution of organofunctional silane (a) can further be low in volatile organic compound (VOC). In one specific embodiment VOC can be byproducts formed from the hydrolysis of organofunctional silane (a) described above. In one more specific embodiment VOC is any organic compound which participates in any atmospheric photochemical reactions; that is any organic compound other than those, which the Environmental Protection Agency (EPA) designates as having negligible photochemical reactivity. In a more-specific embodiment VOC can be selected from the group consisting of methanol, ethanol, n-propanol, 2-propanol, n-butanol, 2-butanol, tert-butanol and combinations thereof. In a further embodiment herein, low in VOC is a level of VOC of specifically less than about 10 weight percent, more specifically less than about 5 weight percent, even more specifically less than about 2 weight percent and most specifically less than about 1 weight percent, said weight percents being based on the total weight of the composition.

In the application of coatings, such as in the application of coatings to metal surfaces, VOC is calculated according EPA Method 24 from percent non-volatile, with corrections on exempt solvents and water. The non-volatile content is measured based on ASTM Standards D2369 and D3960. In one embodiment, generally, a sample of material is placed in a dish and placed in a convection oven at 110° C. for 1 hour. The weight remaining in the dish is then determined. In one embodiment, glycols which are more specific to applications, which exhibit low VOC besides the others described herein are 1,4-cyclohexanedimethanol, trimethylolpropane, glycerol, pentaerythritol and combinations thereof.

The silica sol material comprises aqueous colloidal silica specifically with acidic pH. Some non-limiting examples of silica sol materials are those that may be purchased from Cabot Corporation and from other suppliers such as Wacker Chemie, Degussa, Nissan Chemical, and Nalco Chemical Company. One specific non-limiting example of an effective silica sol, Cab-O-Sperse A205, is an aqueous dispersion of high purity fumed silica in deionized water available from Cabot Corporation. Cab-O-Sperse A205 has a pH of about 5-7, a solids content of about 12%, a viscosity of less than 100 centipoise (cPs) and a specific gravity of about 1.07. In one embodiment herein a colloidal oxide is understood to be the same as a colloidal metal oxide or colloidal metalloid oxide sol and specifically a colloidal metal oxide can be cerium oxide and a colloidal metalloid oxide can be silica. In one embodiment colloidal metal oxide is cerium oxide.

In one embodiment herein, non-limiting exemplary cerium oxide sols are any of those which are commercially available. In one specific embodiment cerium oxide sols that are commercially available, comprise cerium oxide particles in aqueous colloidal suspension. In one more specific embodiment herein some non-limiting commercially available cerium oxide sols that may be mentioned as exemplary include colloidal cerium oxide nitrate and cerium oxide acetate, both available from Rhodia and as well as those cerium oxide sols available from Nyacol Nano Technologies Inc. In one more specific embodiment herein, cerium oxide acetate sol includes about 20 weight % cerium oxide particles. In yet another specific embodiment, some non-limiting exemplary cerium oxide sols includes those having particle sizes of less than about 100 nanometers (nm), more specifically less than about 50 nm and most specifically less than about 20 nm. In another specific embodiment some non-limiting exemplary pHs of cerium oxide sols, are those having pH values of on the order of about 1-9, more specifically, more specifically 1-6 and most specifically 2-4. In yet a more specific embodiment some non-limiting examples of other metal oxide sols include those such as ZnO, $ZrO_2$, $TiO_2$, $Al_2O_3$ and combinations thereof. In one other non-limiting embodiment herein colloidal metal oxide can comprise any colloidal metal oxide other than silica particles (i.e. nanosized silica particles), and/or zinc oxide particles (i.e., nanosized zinc oxide particles), and/or aluminum oxide particles (i.e. nanosized aluminum oxide particles).

In one more specific embodiment aqueous colloidal suspension of metal oxide can comprise metal oxide in an amount of specifically of from about 0.001 to about 36 weight percent, more specifically of from about 0.01 to about 30 weight percent, and most specifically of from about 0.1 to about 20 weight percent, said weight percents being based on the total weight of the composition. In yet a further embodiment herein, aqueous colloidal suspension of metal oxide can further comprise silica, and more specifically silica sol. In another specific embodiment composition can further comprise silica and more specifically silica sol.

In another specific embodiment, in addition to the above combination of sol (colloidal metal oxide) and organofunctional silane (a) or more specifically ureido silanes (such as the non-limiting example of ureidoalkoxysilanes) we have found that the shelf-life of the combination can be markedly improved by the addition of a stabilizing agent thereto. In one specific embodiment, preliminary data suggest that with the addition of certain stabilizers, the shelf life of the sol/ureido silane composition can be extended.

In one other embodiment herein the phrase "stabilizing agent" as used herein shall be understood to be a substance which is (1) soluble in water, (2) not a hazardous air pollutant and optionally additionally not a VOC and (3) retards precipitation or gelation of the condensate.

In another embodiment herein the solubility of the stabilizing agent in water is such that there is at least no visible phase separation resulting from the formation of at least two distinct layers of the stabilizing agent and the aqueous composition and that stabilizing agent is able to retard precipitation or gelation in the composition as a result of using the specific stabilizing agent at the specifically used amount. In a more specific embodiment the stabilizing agent can have a solubility in water of specifically from complete miscibility to about 1 weight percent, more specifically from about 50 to about 2 weight percent and most specifically from about 30 to about 1 weight percent, said weight percents being based on the total weight of the composition.

In yet an even further embodiment herein the retardation of the precipitation or gelation of the condensate can comprise eliminating any visible precipitation or gelation for a period of time from the composition as compared to an equivalent composition except for said stabilizing agent that would have said precipitation or gelation within the same time period.

In another specific embodiment, a host of stabilizing agents may be mentioned as exemplary. In one embodiment herein, some non-limiting examples of stabilizing agents include, for example alcohols, glycols, triols, polyols, glycol ethers, esters, ketones, pyrrolidones, or polyethersilanes and combinations thereof, provided that polyethersilane is different from organofunctional silane (a); and as indicated above, provided that stabilizing agent is limited to materials that are not HAPs. In one embodiment polyether silane is of the general formula $R^6O(EO)_m$—$[CH_2]_n$—Si—$(OR)_3$ where m is 1 to about 20, n is 1 to 12 and $R^6$ is a linear, branched or cyclic organic group of 1 to about 16 carbon atoms, more specifically of 1 to about 12 carbon atoms and most specifically of 1 to about 8 carbon atoms and EO is an oxyethlyene group. In a more specific embodiment the above described polyether silane is at least one of the general formulae $R^6O(EO)_{7.5}$—$CH_2$—$CH_2$—$CH_2$—Si—$(OMe)_3$, or $R^6O(EO)_3$—$CH_2$—$CH_2$—$CH_2$—Si—$(Ome)_3$ where (EO) is as defined, $R^6$ is methyl and (OMe) is a methoxy group. In another embodiment herein any one or more of the herein described stabilizers (stabilizing agents) can be used in any of the compositions and/or methods described herein.

In a more specific embodiment herein, some non-limiting examples of specific stabilizers include wherein stabilizing agent (b) is selected from the group consisting of ethanol, 1-propanol, 2-propanol, 2-methyl-1-propanol, 2-methyl-2-propanol, 1-butanol, 2-butanol, 2-methyl-1-butanol, 2-methyl-2-butanol, 2,2-dimethyl-1-propanol, 1-pentanol, 2-pentanol, 4-methyl-2-pentanol, propylene glycol, 1,3-butanediol, 1,4-butane diol, 2-methyl-1,3-propanediol, 2-methyl-2,4-pentanediol, tetraethylene glycol, poly(ethylene glycol), dipropylene glycol, tripropylene glycol, poly (propylene glycol), 1,5-pentanediol, esterdiol 204, 2,2,4-trimethylpentanediol, 2-ethyl-1,3-hexanediol, glycerol, trimethyolpropane, trimethylolpropane allyl ether, glycerol ethoxylate, glycerol ethoxylate-co-propoxylate triol, glycerol propoxylate, pentaerythritol, 1-methoxy-2-propanol (propylene glycol methyl ether), 1-ethoxy-2-propanol, 1-propoxy-2-propanol, 1-butoxy-2-propanol, 2-butoxyethanol, di(propylene glycol) butyl ether,poly(propylene glycol) monobutyl ether, di(propylene glycol) dimethylether, methyl acetate, ethyl acetate, ethyl lactate, 2-methoxyethyl acetate, 2-butoxyethyl acetate, propylene glycol methyl ether acetate, propylene glycol ethyl ether acetate, acetone, methyl ethyl ketone, diacetone alcohol, $MeO(EO)_{7.5}$—$CH_2$—$CH_2$—$CH_2$—Si—$(OMe)_3$ wherein MeO is methoxy and (EO) is as defined above; and combinations thereof.

In another specific embodiment, the stabilizing agent when used in a stability-increasing amount provides for a period of stability for said composition which is at least two times that of an equivalent composition having no added stabilizing agent. In a further more specific embodiment the stabilizing agent provides a period of stability for said composition, which is at least three times that of an equivalent composition having no added stabilizing agent. In a most specific embodiment the stabilizing agent provides a period of stability for said composition, which is at least five times that of an equivalent composition having no added stabilizing agent. In one more specific embodiment the stabilizing agent provides for a period of stability of the composition of specifically from about 1 hour to about 5 years, more specifically from about 48 hours to about 3 years, even more specifically of from 96 hours to about 2 years, and most specifically of from about 1 week to about 18 months.

In another embodiment the phrase "a stability increasing amount" shall be understood to be an amount of stabilizing agent that provides for the periods of stability defined above. In a more specific embodiment, "a stability-increasing amount" shall be understood to be an amount of stabilizing agent that provides for the retarding of precipitation or gelation of the condensate in a composition as described herein, compared to an equivalent composition that utilizes less than such an amount of the same stabilizing agent. It will be understood that a stability-increasing amount will vary widely depending on factors such as the stabilizing agent, the hydrolyzable alkoxysilane and other composition components as described herein. In one embodiment herein, it will be understood herein that a stability-increasing amount is any additional amount beyond any amount of stabilizing agent that may be generated in the hydrolysis of organofunctional silane and will increase the stability of the aqueous solution of partial and/or complete condensate of organofunctional silane.

In another embodiment herein the compositions described herein are substantially free of chromium and/or phosphate. In one specific embodiment herein, the compositions described herein can have a high flashpoint. In a further specific embodiment high flashpoint can comprise a flashpoint of at least about 21 degrees Celsius, more specifically greater than about 25 degrees Celsius and most specifically greater than about 30 degrees Celsius. In one embodiment herein, high flash point can comprise any of the flashpoints described in U.S. Patent Application No. 2003/0041779, the contents of which are incorporated herein by reference in their entirety.

In another specific embodiment herein, additionally, as an optional adjuvant to the above components, the compositions and methods described herein may include a $C_1$-$C_4$ alkoxy silane compound to provide Si—O bonds in the working solutions. In another specific embodiment herein, such Si—O bonds can comprise Si—O—Si bonds with the adjuvant and the silanes(s) described herein. In another specific embodiment herein, the compositions and methods described herein may include at least one $C_1$-$C_4$ alkoxy silane compound and more specifically at least two $C_1$-$C_4$ alkoxy silane compounds. In one more specific embodiment, these adjuvant compounds can be represented by the formula (IV)

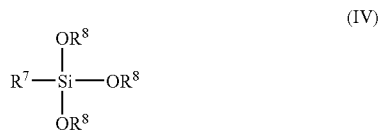

wherein $R^7$ is a monovalent hydrocarbon group having from 1 to 10 carbon atoms, more specifically from about 1 to about 8 carbon atoms and most specifically from about 1 to about 4 carbon atoms, or $OR^8$ and each $R^8$ is independently chosen from $C_1$-$C_4$-alkyl. In one even more specific embodiment herein some non-limiting examples of formula (IV) can be at present, tetraethylorthosilicate (TEOS) or methyltriethoxysilane can be mentioned. In one embodiment herein, these compounds of formula (IV) and others encompassed by the formula will hydrolyze in solution (such as aqueous solution) to provide a source of Si—O bonds. In one other embodiment herein the composition(s) and method(s) herein can further comprise water specifically in addition to any water present in aqueous cerium oxide sol described herein.

In one specific embodiment herein, at present some non-limiting exemplary methods disclosed herein, comprise contacting the desired metal surface with an aqueous sol comprising: (a) Si and/or Ce oxide particles, and (b) a ureido silane compound. In another specific embodiment and as stated above, the sol may include a stabilizing agent (c) and the optional adjuvant (d).

In one embodiment herein, the composition described herein can contain aqueous solution of partial and/or complete condensate of organofunctional silane (a) in an amount of specifically from about 0.01 to about 80, more specifically of from about 0.1 to about 60 and most specifically of from about 1 to about 40; and stabilizing agent in an amount of specifically from about 1 to about 50, more specifically of from about 2 to about 40 and most specifically of from about 3 to about 30; optionally colloidal oxide in an amount of specifically from about 0.001 to about 36, more specifically of from about 0.01 to about 25 and most specifically of from about 0.1 to about 20; and, optionally an adjuvant in an amount of specifically from about 0 to about 15, more specifically of from about 0.1 to about 10 and most specifically of from about 0.1 to about 5 weight percent, said weight percents being based on the total weight of the composition. In another embodiment the methods described herein can use the same composition amounts described above for the composition.

In one more specific embodiment, some non-limiting examples of exemplary sol compositions are those which are substantially chromate and/or specifically substantially phosphate free and include (a) 0.001 to 36 wt %, more specifically from about 0.01 to about 25 wt % and most specifically from about 0.1 to about 20 wt % colloidal metal oxide or silica sol particles;

(b) 0.01 to 80 wt %, more specifically from about 0.1 to about 70 wt % and most specifically from about 3 to about 60 wt % ureido silane and hydrolyzate forms thereof;

(c) optional stabilization additive (agent) percent in an amount of about 0.00 to 25 wt %, more specifically from about 0.1 to about 20 wt % and most specifically from about 1 to about 15 wt %; and (d) optional $C_1$-$C_4$ alkoxy silane compound or hydrolyzate thereof in an amount of about 0.00-25 wt %, more specifically from about 0.01 to about 20 wt % and most specifically from about 1 to about 15 wt %; remainder being predominantly water and minimum amounts of pH adjustment agents, said minimum amounts of pH adjustment agents being specifically from about 0.001 to about 1.2, more specifically from about 0.01 to about 1.0 and most specifically from about 0.01 to about 0.6 weight percent. In one embodiment, the weight of the composition(s) (such as specifically the composition described herein) is, in total, 100 weight percent (wt %). All weight percents expressed herein shall be understood to be based upon the total weight of the composition unless indicated otherwise. In another embodiment herein, the pH of the sol compositions (such as the sol compositions described herein) may specifically range from about 1-7, more specifically from about 2 to about 6 and most specifically from about 3 to about 5.

In a most specific embodiment herein there are provided compositions having the following range (in wt %) of the components:

(a) 0.001 to 10 wt % Si and/or Ce oxide particles;

(b) 3 to 60 wt % ureido silane or hydrolyzate form thereof;

(c) 1 to 15 wt % stabilizing agent and (d) 1-15 wt % adjuvant, remainder predominantly water and minor amounts of pH regulating (adjustment) agents, wherein minor amounts is equivalent to minimum amounts described above for pH adjustment agents. In one embodiment herein the herein-described compositions having components in the noted weight percent amounts are present in such weight percent amounts based on the total combined weight percent of the compositions (e.g., 100 weight percent).

In a more specific embodiment herein, the requisite metal surface, (which for example, may be any one or more of those described herein), may be contacted by the treatment in spray, immersion, or roller applications. In yet another embodiment, the treatment (such as the treatment described herein) is dried, and the metal surface is ready for painting or other coating applications.

In another embodiment herein the compositions and/or methods described herein can be used to provide a conversion or passivation coating for metals such as steel and aluminum wherein said coating improves adhesion to further coatings thereon such as the non-limiting example of paint, and likewise provides improved corrosion protection to said metals. In yet another embodiment, metals treated by the compositions and/or methods herein can be used in commercial and industrial applications of coated metal sheets such as sheet metal used in construction and the like.

In yet another specific embodiment herein, the conversion or passivation treatment described herein is applied to the treated metal surface to result in a conversion coating weight of greater than about 0.5 milligram per square foot (5 mg per square meter) of the treated surface with a weight of about 2-500 milligrams per square foot (21.5 to 5400 mg/per square meter) being more specific and with a most specific weight of from about 3 to about 300 milligrams per square foot (32 to about 3200 mg per square meter). In one specific embodiment for use in commercial applications, working solutions comprising about 1-100 wt %, more specifically 5-70 wt %, and most specifically from about 5 to about 50 wt % concentrations of the above formulations (compositions) are used to contact the desired metal surfaces; based on total weight of the commercial applications.

In another embodiment herein, hazardous air pollutants (HAPS) such as the non-limiting example of MeOH are removed from the mixing process (method) in which the ureido silane, and (aqueous) cerium sol are first mixed. In another embodiment, after removal of substantial amount of the MeOH or other volatiles formed via this mixing, stabilizing agents and optionally water, are added to the reaction mixture to enhance product stability. In one specific embodiment, the stabilizing agents, especially those with a boiling point above that of water, can also be added before the removal of MeOH and/or other volatiles. Methanol is a hazardous air pollutant (HAP) and volatile organic compound (VOC).

In one specific embodiment herein, as stated above there is provided a method for treating the surfaces of a metal to provide for the formation of a conversion or passivation coating on a metal surface comprising contacting said metal surface with a stabilized aqueous sol composition comprising (a) aqueous sol comprising colloidal oxide particles (b) a ureido silane compound and (c) a stabilizing agent, said stabilizing agent (c) being added prior to or following the removal of volatile hydrolysis byproducts resulting from the mixture of (a) and (b). In yet a further specific embodiment, methanol or other volatiles which are removed from the aqueous sol composition described above can be the byproducts of the hydrolysis of ureido silane, such as the non-limiting example of the byproducts of the hydrolysis of ureidosilane having the general formula (II) which is described above, more specifically γ-ureidopropyltrimethoxysilane.

EXAMPLES

The disclosure herein will now be described in conjunction with the following examples which are to be regarded as being illustrative of certain embodiments of the disclosure herein but should not be viewed to restrict the disclosure. All percents herein are weight percents based on the total weight of the mixture unless indicated otherwise.

Example 1

The following formulations were evaluated to examine the performance of the colloidal metal oxide silane mixture. Pretreatment solutions were prepared by mixing a silane, colloidal cerium oxide and water (Table 1A)

TABLE 1A

|  | Comparative Examples | | | Ex | Ex |
|---|---|---|---|---|---|
|  | A1 | B1 | C1 | D1 | E1 |
| Aminopropyltrimethoxysilane | 5% | 5% | 5% |  |  |
| Ureidopropyltrimethoxysilane |  |  |  | 5% | 5% |
| Colloidal cerium oxide (20%) |  |  | 2% |  | 2% |
| Colloidal silica (34%) |  | 2% |  |  |  |
| Water | 95% | 93% | 93% | 95% | 93% |
| pH | 6 | 6 | 6 | 3 | 3 |

Ex is Example and is provided to differentiate from the comparative examples.

Advanced Coatings Laboratories (ACT) panels were used: cold rolled steel (CRS) and EZ60/60 Electrogalvanized steel (EG). Panels were processed as follows:

The panels were cleaned—Kleen 182 available from General Electric Water Process and Technology (GEWPT) via immersion at 120° F., 3 minute contact time, (CRS), or 1 minute (EG)

The panels were rinsed—Deionized (DI) water flooded over the panel until a water break free surface was obtained The panels were dried with compressed air at room temperature The panels were pretreated—immerse panel into the solution for 5 seconds (secs). (CRS) and 30 seconds (EG) at ambient temperature.

The panels were allowed to have the treatment solution drain off of the panel for 30 sec.

The panels were dried—use hot air gun to dry the solution on the panel surface.

Panels were painted with White Polycron III (AG452W3223) available from PPG Industries. The paint was applied and cured per the manufacturer's specifications. After painting, the panels were subjected to Neutral Salt Spray Testing (NSS) according to ASTM B-117 for 96 hours and rated for creep from the scribe in millimeters in accordance with ASTM D 1654 (Table 1B). Performance was compared to industry standard iron and zinc phosphate pretreatments available from ACT

TABLE 1B

| NSS Exposure millimeters (mm) Creep | | |
|---|---|---|
| Formulation | EG 96 Hours | CRS 96 Hours |
| A1 Comparative | 5 | 5 |
| B1 Comparative | 3 | 3 |
| C1 Comparative | 5 | 2 |
| Ex D1 | 0.7 | 0.7 |
| Ex E1 | 0.5 | 0.4 |
| Control-Iron phosphate/chrome seal | 0.6 | 0.5 |
| Control-Zinc phosphate chrome seal | 0.6 | 0.3 |

Example 2

The following formulations were prepared to compare the performance of a variety of silanes. Pretreatment solutions were prepared by mixing silane, colloidal cerium oxide (20% active and acetate stabilized), colloidal silica, and water (Table 2A). Advanced Coatings Laboratories (ACT) panels were used—cold rolled steel (CRS) and G70/70 Hot dipped galvanized steel (HDG). Panels were processed as follows:

The panels were cleaned—3% Kleen 132 (commercially available from GEWPT),

130° F., spray applied (10 seconds for HDG, 30 seconds for CRS)

The panels were rinsed—5 seconds, tap water
The panels were rinsed—5 seconds, DI water
The panels were blow dried to remove water from the surface Then the spin application of the pretreatments was done—approximately 30 to 40 milliliters (mls) of pretreatment solution was flooded onto the surface of a panel. The Panel was spun so that excess material was removed via centrifugal force. A warm air gun was then used to dry the remaining pretreatment solution onto the metal surface.

Pretreated panels were painted as follows:

HDG—was painted with PPG Truform ZT2 Black 3MB72689I available from PPG Industries.

CRS—was painted with Akzo Nobel Lighting Fixture White PW8R30708

Paints were applied and cured per manufacturer's specifications supplied by the manufacturer.

Painted panels were then subjected to neutral salt spray testing (NSS) per ASTM B117. Panels were then rated for corrosion resistance via measuring the millimeters of creep from a scribe, at the number of hours exposure to salt spray, as indicated via ASTM D1654 (Table 2B).

TABLE 2A

| | \multicolumn{8}{c|}{Formulations} |
|---|---|---|---|---|---|---|---|---|
| | Ex A2 | Ex B2 | Ex C2 | Ex D2 | Ex E2 | \multicolumn{2}{c}{Comparative Examples} | Ex H2 |
| | | | | | | F2 | G2 | |
| Wt % CeO$_2$ (20%) | 2 | | 2 | 2 | 2 | 2 | 2 | 2 |
| Wt % Silquest A-1524 | 2.5 | 2.5 | 1.3 | 1.7 | 1.9 | | | |
| Wt % Cabosperse A205 | 1 | 1 | 1 | 1 | 1 | 1 | 1 | 1 |
| Silquest A-1100 | | | 1.3 | 0.9 | 0.7 | | | |
| Silquest A-1637 | | | | | | 2.5 | | |
| Silquest A-1110 | | | | | | | 2.5 | |
| Silquest A-186 | | | | | | | | 2.5 |
| Water | 94.5 | 96.5 | 94.4 | 94.4 | 94.4 | 94.5 | 94.5 | 94.5 |

Note -
for samples B2 through G2, acetic acid was added to adjust the pH of the treatment solution to 4.0 to 4.3.
Cabosperse A205 - 12% active colloidal silica available from Cabot Corporation.
Silquest A-1524 - gamma-ureidopropyltrimethoxysilane available from GE Silicones.
Silquest A-1100 - gamma-aminopropyltriethoxysilane available from GE Silicones TABLE 2A-continued

| | \multicolumn{8}{c|}{Formulations} |
|---|---|---|---|---|---|---|---|---|
| | Ex A2 | Ex B2 | Ex C2 | Ex D2 | Ex E2 | \multicolumn{2}{c}{Comparative Examples} | Ex H2 |
| | | | | | | F2 | G2 | |

Silquest A-186 - beta-(3,4-epoxycyclohexyl)ethyltrimethoxysilane available from GE Silicones.
Silquest A-1637 - delta-aminohexyltrimethoxysilane available from GE Silicones.
Silquest A-1110 - gamma-aminopropyltrimethoxysilane available from GE Silicones.
MeO(EO)$_{7.5}$—CH$_2$—CH$_2$—CH$_2$—Si—(OMe)$_3$ is Silquest A-1524 wherein MeO is methoxy and (EO) is an oxyethlyene group.

TABLE 2B

| | \multicolumn{4}{c|}{NSS Exposure mm Creep} |
|---|---|---|---|---|
| Formulation | HDG 168 Hours | HDG 336 Hours | CRS 168 Hours | CRS 336 Hours |
| Ex A2 | 0.8 | 2.3 | 2.1 | 5.3 |
| Ex B2 | 7.4 | 10.1 | 2.2 | 6.1 |
| Ex C2 | 20+ | NA | 3.85 | NA |
| Ex D2 | 20+ | NA | 4.2 | NA |
| Ex E2 | 20+ | NA | 4.0 | NA |
| F2 Comparative | 20+ | NA | 8.5 | NA |
| G2 Comparative | 20+ | NA | 20+ | NA |
| Ex H2 | 20+ | NA | 20+ | NA |

NA - rating is not available. Panel had been removed from testing at earlier exposure time.

Examples 3 and 4

To demonstrate the ability of the stabilizing agents to improve the stability of the gamma-ureidopropyltrimethoxysilane Silquest A-1524 available from GE Silicones plus colloidal cerium oxide based pretreatment from Rhodia, concentrated solutions were prepared with and without the addition of stabilizing agents and monitored to determine how many days pass until precipitation or gelling of the solution occurs. (Tables 3 and 4). The balance of the solutions being water.

TABLE 3

Stabilizing Effect of Additives

| Sample | % A-1524 | % CeO$_2$ | Additive | % Additive | Initial | 21 days | 45 days | 3.4 mos. | 6.4 mos. |
|---|---|---|---|---|---|---|---|---|---|
| A3 | 15 | 5 | None | 0 | yellow solution | precipitate* | | | |
| B3 | 15 | 5 | EtOH | 15 | yellow solution | yellow solution | yellow solution | yellow solution | yellow solution |
| C3 | 15 | 5 | EtOH | 10 | yellow solution | yellow solution | slight haze | gel | |
| D3 | 15 | 5 | EtOH | 5 | yellow solution | yellow solution | precipitate* | | |
| E3 | 15 | 5 | Dowanol PM | 5 | yellow solution | yellow solution | milky solution | precipitate* | |
| F3 | 15 | 5 | propylene glycol | 5 | yellow solution | yellow solution | precipitate* | | |
| G3 | 15 | 5 | propylene glycol | 10 | yellow solution | yellow solution | slight haze | slight haze | translucent |

*precipitate with clear liquid on top
Dowanol PM is 1-methoxy-2-propanol
EtOH is ethanol
Samples A3, B3, C3, D3, E3, F3 and G3 are all examples except that A3 omits the presence of stabilizing agent.
CeO$_2$ is a 20% colloidal dispersion of cerium oxide particles in water

Example 4

To expand on the stabilizing agents that can produce a stable aqueous solution, additional samples were prepared. (Table 4). As in Example 3, solutions were monitored to determine the number of days until precipitation or gelling occurred. The balance of the solutions being water.

15 grams of 1-methoxy-2-propanol (Dowanol PM) was then added, and this mixture was analyzed and found to contain only 0.3% methanol (MeOH). The percent non-volatile content was determined to be 26.8% per ASTM D-2369.

The following formulations were prepared to evaluate the impact of the stabilizing agents on the performance of the colloidal cerium oxide+silane solution.

TABLE 4

Effect of Additional Stabilizing Agents

| | % A-1524 | % $CeO_2$ | Additive | % Additive | Initial | 1 day | 17 days | 50 days | 3.5 months | 6 months |
|---|---|---|---|---|---|---|---|---|---|---|
| A4 | 15 | 5 | EtOH | 5 | clear yellow | clear yellow | translucent | precipitate | | |
| B4 | 15 | 5 | EtOH | 10 | clear yellow | clear yellow | translucent | translucent | translucent | opaque solution |
| C4 | 15 | 5 | Acetone | 5 | clear yellow | clear yellow | translucent | translucent | opaque | milky white solution |
| D4 | 15 | 5 | Methyl acetate | 5 | clear yellow | clear yellow | translucent | precipitate | | |
| E4 | 15 | 5 | A-1230 | 5 | clear yellow | clear yellow | clear yellow | clear yellow | clear yellow | clear yellow solution |
| F4 | 15 | 5 | Dowanol PM | 5 | clear yellow | clear yellow | translucent | translucent | precipitate | |
| G4 | 15 | 5 | Dowanol PM | 10 | clear yellow | clear yellow | translucent | translucent | translucent | translucent solution |
| H4 | 15 | 5 | None | 0 | clear yellow | clear yellow | precipitate | | | |
| I4 | 15 | 5 | A-1110 | 5 | milky white | precipitate with clear solution | | | | |
| J4 | 15 | 5 | A-1100 | 5 | milky white | precipitate with milky solution | | | | |
| K4 | 15 | 5 | A-1110 | 1.5 | milky white | white gel | | | | |
| L4 | 15 | 5 | A-1100 | 1.8 | milky white | white gel | | | | |

A-1230 is a polyether silane available from GE Silicones
A-1110 is gamma-aminopropyltrimethoxysilane available from GE Silicones
A-1100 is gamma-aminopropyltriethoxysilane available from GE Silicones
Dowanol PM is predominantly 1-methoxy-2-propanol available from Dow Chemical.
$CeO_2$ is a 20% colloidal dispersion of cerium oxide particles in water All of the examples A4, B4, C4, D4, E4, F4, G4, H4, I4, J4, K4, and L4 in table 4 are examples, except that H4, I4, J4, K4 and L4 omit stabilizing agent or use other than the herein described stabilizing agent.

Example 5

In order to minimize the presence of hazardous air pollutants and enhance the stability of the $CeO_2$/ureidosilane sols in accordance with the invention, methanol formed from the hydrolysis of γ-ureidopropyltrimethoxysilane was removed. Thus, 150 grams of Silquest A-1524 (γ-ureidopropyltrimethoxysilane) available from GE Silicones, 50 grams of colloidal $CeO_2$ acetate solution (20 weight percent colloidal aqueous dispersion available Rhodia), and 10 grams of Silquest A-1230 (polyether silane) available from GE Silicones were mixed in a 32 oz. jar for 20 minutes. After mixing, 365 grams of D.I. water was added with stirring followed by addition of 25.4 grams of 2-methyl-2,4-pentanediol (hexylene glycol, HG). Methanol was removed from the reaction mixture in a round bottom flask at about 40° C. and 150-60 mm Hg followed by sparging with nitrogen for a period of 18 hours at ambient temperature to give 362 grams of a clear yellow solution. This indicated that 238 grams of material, presumably methanol and water was removed. 138 grams of D.I. water, was then added to result in an aqueous solution containing the active ureidopropylsilane compound (equivalent in silane content to a 30% aqueous solution of the γ-ureidopropyltrimethoxysilane), 10% $CeO_2$ (20% solids), and 5% hexylene glycol.

Example 6

Pretreatment concentrates were prepared by mixing the silane, colloidal cerium oxide acetate available from Rhodia, water and additives (Dowanol PM, 2-methyl-1,3-propanediol, 2-methyl-2,4-pentanediol, Silquest A-1230 available from GE Silicones) via the procedure described in Example 5. (Table 6A).

TABLE 6A

| | 6A | 6B | 6C | 6D | 6E |
|---|---|---|---|---|---|
| Ureidopropyltrimethoxysilane | 30% | 30% | 30% | 30% | 30% |
| Colloidal cerium oxide (20%) | 10% | 10% | 10% | 10% | 10% |
| 2-methyl-1,3-propanediol | 10% | | 5% | | |
| 2-methyl-2,4-pentanediol | | 10% | | 10% | 5% |
| Dowanol PM | 3% | 3% | 3% | 3% | 3% |
| Silquest A-1230 | | | | 2% | |
| Water | 47% | 47% | 52% | 45% | 52% |

ACT Laboratories cold roll steel (CRS) and G70 hot dipped galvanized steel (HDG) available from ACT Laboratories and Q panel 3105 alloy aluminum available from Q Panel were processed as follows:

The panels were cleaned—Kleen 132 at 130° F., 5 sec spray for HDG, 30 sec spray for CRS, and 5 sec spray for aluminum The panels were rinsed—DI water, 5 sec The panels were dried with air at room temperature The panels were pretreated—pretreatment concentrates were diluted with DI water to 10% w/w and applied via reverse roll coating The panels were dried—using hot air gun to dry the solution on the panel surface Cold rolled steel panels were painted with a lighting fixture white (PW8R30708) from Akzo Nobel Coatings; aluminum panels were painted with a thermosetting white polyester (91101-76441) from the Valspar Corporation; and hot-dipped galvanized panels were painted with black Truform ZT2 (3MB72689I) from PPG Industries. The paint was applied and cured per the manufacturer's specifications provided by the manufacturer. After painting, CRS and HDG panels were subjected to Neutral Salt Spray Testing (NSS) according to ASTM B-117 for 336 hours and 500 hours respectively. Aluminum panels were subjected to Acetic Acid Salt Spray (AASS) according to ASTM B 117-97, Appendix I for 500 hours. All panels were then rated for creep from the scribe in millimeters (mm) in accordance with ASTM D 1654 (Tables 6B,C, D).

TABLE 6B

NSS Exposure CRS
mm Creep

| Formulation | CRS 336 Hours |
|---|---|
| 6A | 3.20 |
| 6B | 2.50 |
| 6C | 2.80 |
| 6D | 4.40 |
| 6E | 2.20 |
| Iron phosphate/chrome seal (Permatreat 2102/ Chemseal 7750) available from GEWPT | 7.70 |
| Chrome No-Rinse (Permatreat 1510) available from GEWPT | 2.2 |
| Multi Metal-Chrome No-Rinse (Permatreat 1500) available from GEWPT | 7.9 |

TABLE 6C

NSS Exposure HDG
mm Creep

| Formulation | HDG 500 Hours |
|---|---|
| 6A | 2.65 |
| 6B | 1.08 |
| 6C | 2.93 |
| 6D | 4.60 |
| 6E | 1.65 |
| Zinc phosphate/chrome seal (Permatreat 2325/ Chemseal 7750) available from GEWPT | 1.4 |
| Multi metal Chrome No-Rinse (Permatreat 1500) available from GEWPT | 2.2 |

TABLE 6D

AASS Exposure Aluminum
mm Creep

| Formulation | Aluminum 500 Hours |
|---|---|
| 6A | 1.25 |
| 6B | 1.58 |
| 6C | 1.25 |
| 6D | 1.15 |
| 6E | 1.25 |
| Multi-metal Chrome No-Rinse (Permatreat 1500) | 0.03 |

Example 7 below describes the use of nitrate stabilized colloidal cerium oxide instead of acetate stabilized cerium oxide.

Example 7

Solution was prepared from gamma-ureidopropyltriethoxysilane and nitrate stabilized colloidal $CeO_2$.

To a 2-liter round bottom flask was added 450 grams of melted gamma-ureidopropyltriethoxysilane which was synthesized in the laboratory. Nitrate stabilized colloidal $CeO_2$ (150 grams) available from Rhodia was slowly added to the silane with good mixing. After stirring for 1.5 hrs, 350 grams of warm deionized water was added and the mixture was stirred over weekend. 550 grams of deionized water was then added.

To 320 grams of the aforementioned mixture was added 20 grams of 2-methyl-2,4-pentanediol (hexylene glycol). Additional 30 grams of deionized water was added, then the mixture was stripped at about 60° C., and about 740 mmHg for 1.5 hours (hrs). Based on material weight at the end, 125 grams of material, presumably methanol and water, was removed. Deionized water, 75 grams, was added to give an aqueous solution containing 30% gamma-ureidopropyltriethoxysilane available from Rhodia and 10% $CeO_2$ (of 20% solid). GC analysis found this sample to contain 0.65% ethanol (EtOH) by total weight of the sample.

Example 8

This example shows that an aqueous solution containing no VOC's can be prepared.

Solution prepared from gamma-ureidopropyltriethoxysilane available from GE Silicones and acetate stabilized colloidal $CeO_2$ available from Rhodia and Silquest A-1230, a polyether silane available from GE Silicones.

To an 8-oz wide mouth jar was added 15 grams of Silquest A-1524 available from GE Silicones, 5 grams of colloidal $CeO_2$ solution acetate stabilized available from Rhodia, 5 grams Silquest A-1230 available from GE Silicones and 75 grams of deionized water. After stirring uncovered in hood for 4 days, a viscous liquid of 20 grams was obtained. To the jar was added 80 grams of deionized water to give a clear liquid. The methanol content was found to be less than 0.001%. The appearance of this silane-containing aqueous solution was unchanged at a period of more than 24 months.

Example 9

This is a comparative example. Solution prepared from gamma-ureidopropyltrimethoxysilane Silquest A-1524 available from GE Silicone, silica sol Cab-O-Sperse A205 and MPDIOL™ glycol available from Lyondell Chemical Company. To a suitable container was added 30 grams Silquest® A-1524 (gamma-ureidopropyltrimethoxysilane) available from GE Silicones, 10 grams of CAB-O-Spearse A-205 available from Cabot Corporation, 100 grams deionized water, and 10 grams MPDIOL™ glycol to give a cloudy solution after mixing. The mixture was then nitrogen sparged for 48 hours to remove the methanol released from the hydrolysis of Silquest A-1524. The sparging resulted in the removal of 55 grams of material, presumably methanol and water, from the mixture, leaving 95 grams of a milky white solution with some white solid. Two days later the whole content of said mixture had become a white solid gel.

Example 10

Solution prepared from gamma-ureidopropyltrimethoxysilane Silquest A-1524 available from GE Silicones, CeO$_2$ sol available from Rhodia and MPDIOL™ glycol.

To a suitable container was added 30 grams Silquest® A-1524 (gamma-ureidopropyltrimethoxysilane) available from GE Silicones, 10 grams of colloidal cerium oxide acetate available from Rhodia, 100 grams deionized water, and 10 grams MPDIOL™ glycol to give a clear yellow solution. The mixture was then nitrogen sparged for three days to remove the methanol released from the hydrolysis of Silquest A-1524. The sparging resulted in the removal of 104 grams of material, presumably methanol and water, from the mixture leaving 46 grams of a yellow viscous liquid after which, 49 grams of deionized water was added to the remaining mixture to give a clear yellow liquid. This liquid remained unchanged after 21 days.

Example 11

This is a comparative example. Solution prepared from gamma-ureidopropyltrimethoxysilane Silquest A-1524 and available from GE Silicones, Cab-O-Sperse A205 silica sol available from Cabot Corporation and MPDIOL™ glycol.

To a suitable container was added 30 grams Silquestg A-1524 (gamma-ureidopropyltrimethoxysilane) available from GE Silicones, 10 grams of CAB-O-Spearse A-205 silica sol available from Cabot Corporation, 100 grams deionized water, and 10 grams MPDIOL™ glycol to give a cloudy solution after mixing. The mixture was then nitrogen sparged for 44 hours to remove the methanol released from the hydrolysis of Silquest A-1524. The sparging resulted in the removal of 86.5 grams of material, presumably methanol and water, from the mixture, leaving 63.5 grams of a milky white solution with some white solid. Deionized water, 11.5 grams, was added to give a milky solution. Two days later the whole content of said mixture had become a white solid gel.

Example 12

Solution prepared from gamma-ureidopropyltrimethoxysilane Silquest A-1524 and available from GE Silicones, CeO$_2$ sol available from Rhodia and MPDIOL™ glycol.

To a suitable container was added 30 grams Silquest® A-1524 (gamma-ureidopropyltrimethoxysilane) available from GE Silicones, 10 grams of colloidal cerium oxide acetate available from Rhodia, 100 grams deionized water, and 10 grams MPDIOL™ glycol to give a clear yellow solution. The mixture was then nitrogen sparged for 44 hours to remove the methanol released from the hydrolysis of Silquest A-1524. The sparging resulted in the removal of 81 grams of material, presumably methanol and water, from the mixture leaving 69 grams of a yellow liquid after which, 6 grams of deionized water was added to the remaining mixture to give a clear yellow liquid. This liquid remained as yellow liquid after 16 days.

Example 13

Solution prepared from gamma-ureidopropyltrimethoxysilane and 2-methyl-1,3-pentanediol (hexylene glycol)

To a suitable container was added 36 grams Silquest® A-1524 (gamma-ureidopropyltrimethoxysilane), and 55.5 grams of deionized water that has been acidified with acetic acid to pH 3.5. After mixing, the pH of the aqueous solution was found to be 4.1. An additional 60 grams of regular deionized waster was added followed by 15 grams of hexylene glycol (2-methyl-1,3-pentanediol). The clear, colorless mixture was then nitrogen sparged for 6 days to remove the methanol released from hydrolysis of Silquest A-1524. The sparging resulted in the removal of 120.9 grams of material, presumably methanol, water and some hexylene glycol, from the mixture leaving 45.7 grams of a liquid that had two layers. To this two layer liquid was added 6.7 grams 1-methoxy-2-propanol, 15.3 grams hexylene glycol and 50 grams deionized water to give a clear liquid which was stable for more than 18 months.

While the invention has been described in detail in connection with specific embodiments thereof, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be limited by the foregoing description.

What is claimed is:
1. A composition consisting essentially of:
a) an aqueous solution of partial and/or complete condensate of ureidosilane of the general formula (I):

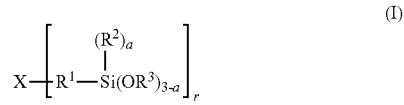

wherein
R$^1$ is a linear, branched or cyclic divalent organic group of 1 to 12 carbon atoms forming a stable bridge between ureido group X and the silyl group;
each occurrence of R$^2$ independently is alkyl, aryl, or aralkyl group of from 1 to 16 carbon atoms;
each occurrence of R$^3$ independently is hydrogen, acetyl, alkyl, or alkoxy-substituted alkyl group having from 1 to 16 carbon atoms;
X is an ureido group of valence r selected from the group consisting of —NR(C=O)NR$^2$, —NR(C=O)NR—, (—)$_2$N(C(=O)NR$^2$, (—)$_2$N(C(=O)NR— and (—)$_2$N (C(=O)N(—)$_2$, wherein R is independently selected from the group consisting of hydrogen, alkyl group having from 1 to 6 carbon atoms, cycloalkyl group, alkenyl group having from 1 to 6 carbon atoms, arylene group and alkarylene group;
r is an integer of from 1 to 4; and
a is an integer of from 0 to 2, in the amount of from 0.01 to 80 weight percent and having no hazardous air pollutant in excess of 0.1 weight percent of the composition, wherein said aqueous solution is not stable and having visible precipitate or gel within a period of time from 1 week to 18 months;
b) a stabilizing agent selected from the group consisting of alcohols, glycols, triol, polyols, glycol ethers, esters, ketones, pyrolidones and polyether silanes in the amount of from 1 to 50 weight percent;
and,
c) a colloidal cerium oxide in the amount of from 0.001 to 36 weight percent,
wherein the stabilizing agent (b) stabilizes aqueous solution (a) to produce a stable composition which does not contain any visible precipitation or gelation for a period of time from 1 week to 18 months and wherein said weight percent amounts are based on the total weight of the composition.

2. The composition of claim 1 wherein X is —NR(C=O)NR$_2$, and wherein R is hydrogen.

3. The composition of claim 1 wherein the ureidosilane is gamma-ureidopropyltrimethoxysilane or gamma-ureidopropyltriethoxysilane.

4. The composition of claim 1 wherein the ureidosilane is selected from the group consisting of gamma-ureidopropyltrimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, gamma-ureidopropylmethylmethoxyethoxysilane, N,N'-bis-(3-triethoxysilylpropyl)urea, N,N'-bis-(3-trimethoxysilylpropyl)urea, N,N'-bis-(3-diethoxymethylsilylpropyl)urea, N,N'-bis-(3-diisopropoxymethylsilylpropyl)urea, N,N-bis-(3-triethoxysilylpropyl)urea, N,N-bis-(3-trimethoxysilylpropyl)urea, N,N-bis-(3-diethoxymethylsilylpropl)urea, N,N-bis-(3-diisopropoxymethylsilylpropyl)urea, N,N,N'-tris-(3-triethoxysilylpropyl)urea, N,N,N'-bis-(3-trimethoxysilylpropyl)urea, N,N,N'-bis-(3-diethoxymethylsilylpropyl)urea, N,N,N'-bis-(3-diisopropoxymethylsilylpropyl)urea, N,N,N',N'-tetrakis-(3-triethoxysilylpropyl)urea, N,N,N',N'-tetrakis-(3-trimethoxysilylpropyl)urea, N,N,N',N'-tetrakis-(3-diethoxymethylsilylpropyl)urea, N,N,N',N'-tetrakis-(3-diisopropoxymethylsilylpropyl)urea, and combinations thereof.

5. The composition of claim 1 wherein the stabilizing agent (b) is at least one member selected from the group consisting of alcohols, glycols, triols, polyols and glycol ethers.

6. A composition consisting essentially of:
a) an aqueous solution of partial and/or complete condensate of ureidosilane of the general formula (I):

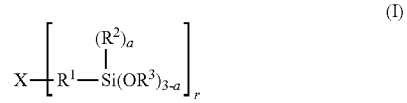

wherein

R$^1$ is a linear, branched or cyclic divalent organic group of 1 to 12 carbon atoms;

each occurrence of R$^2$ independently is alkyl, aryl, or aralkyl group of from 1 to 16 carbon atoms;

each occurrence of R$^3$ independently is hydrogen, acetyl, alkyl, or alkoxy-substituted alkyl group having from 1 to 16 carbon atoms;

X is an ureido group of valence r selected from the group consisting of —NR(C=O)NR$^2$, —NR(C=O)NR—, (—)$_2$N(C(=O)NR$^2$, (—)$_2$N(C(=O)NR— and (—)$_2$N(C(=O)N(—)$_2$, wherein R is independently selected from the group consisting of hydrogen, alkyl group having from 1 to 6 carbon atoms, cycloalkyl group, alkenyl group having from 1 to 6 carbon atoms, arylene group and alkarylene group;

r is an integer of from 1 to 4; and a is an integer of from 0 to 2, in the amount of from 0.01 to 80 weight percent and having no hazardous air pollutant in excess of 0.1 weight percent of the composition, wherein said aqueous solution is not stable and having visible precipitate or gel within a period of time from 1 week to 18 months;

b) a stabilizing agent which is a polyether silane having the general formula R$^6$O(EO)$_m$—[CH$_2$]n-Si—(OR)$_3$ where m is 1 to about 20, n is 1 to 12 and R$^6$ is a linear, branched or cyclic organic group of 1 to about 16 carbon atoms and EO is an oxyethylene group in the amount of from 1 to 50 weight percent; and, c) a colloidal cerium oxide in the amount of from 0.001 to 36 weight percent, wherein the stabilizing agent (b) stabilizes aqueous solution (a) to produce a stable composition which does not contain any visible precipitation or gelation for a period of time from 1 week to 18 months and wherein said weight percent amounts are based on the total weight of the composition.

7. The composition of claim 6 wherein the polyether silane is at least one of the general formulae R$^6$O(EO)$_{7.5}$—CH$_2$—CH$_2$—CH$_2$—Si—(OMe)$_3$, or R$^6$O(EO)$_3$—CH$_2$—CH$_2$—CH$_2$—Si—(OMe)$_3$ where R$^6$ is methyl and (OMe) is a methoxy group.

8. The composition of claim 1 wherein the stabilizing agent (b) is selected from the group consisting of is selected from the group consisting of ethanol, 1-propanol, 2-propanol, 2-methyl-1-propanol, 2-methyl-2-propanol, 1-butanol, 2-butanol, 2-methyl-1-butanol, 2-methyl-2-butanol, 2,2-dimethyl-1-propanol, 1-pentanol, 2-pentanol, 4-methyl-2-pentanol, propylene glycol, 1,3-butanediol, 1,4-butane diol, 2-methyl-1,3-propanediol, 2-methyl-2,4-pentanediol, tetraethylene glycol, poly(ethylene glycol), dipropylene glycol, tripropylene glycol, poly(propylene glycol), 1,5-pentanediol, esterdiol 204,2,2,4-trimethylpentanediol, 2-ethyl-1,3-hexanediol, glycerol, trimethyolpropane, trimethylolpropane allyl ether, glycerol ethoxylate, glycerol ethoxylate-co-propoxylate triol, glycerol propoxylate, pentaerythritol, 1-methoxy-2-propanol (propylene glycol methyl ether), 1-ethoxy-2-propanol, 1-propoxy-2-propanol, 1-butoxy-2-propanol, 2-butoxyethanol, di(propylene glycol) butyl ether, poly(propylene glycol) monobutyl ether, di(propylene glycol) dimethylether, methyl acetate, ethyl acetate, ethyl lactate, 2-methoxyethyl acetate, 2-butoxyethyl acetate, propylene glycol methyl ether acetate, propylene glycol ethyl ether acetate, acetone, diacetone alcohol, MeO(EO)$_{7.5}$—CH$_2$—CH$_2$—CH$_2$—Si—(OMe)$_3$ wherein MeO is methoxy and (EO) is an oxyethylene group; and combinations thereof.

9. The composition of claim 1 wherein said composition is substantially free of volatile organic compounds selected from the group consisting of methanol, ethanol, n-propanol, 2-propanol, n-butanol and tert-butanol.

10. The composition of claim 1 wherein the amount of (a) is of from 1 to 40 weight percent weight percent and (b) is of from 0.1 to 20 weight percent.

11. The composition of claim 1, wherein said composition is for treating a metal surface to form a conversion or passivation coating thereon.

12. The composition of claim 11 wherein R$^1$ is a linear divalent organic group of 1 to 12 carbon atoms forming a stable bridge between ureido group X and the silyl group; each occurrence of R$^2$ independently is an alkyl of from 1 to 16 carbon atoms; each occurrence of R$^3$ independently is hydrogen or alkyl of from 1 to 16 carbon atoms; X is an ureido group of valence r, wherein r is 1; and a is 0.

13. The composition of claim 12 wherein ureidosilane (a) is selected from the group consisting of gamma-ureidopropyltrimethoxysilane, gamma-ureidopropyltriethoxysilane, gamma-ureidopropyldimethoxyethoxysilane, gamma-ureidopropylmethoxydiethoxysilane, gamma-ureidopropylmethyldimethoxysilane, gamma-ureidopropylmethyldiethoxysilane, and gamma-ureidopropylmethylmethoxyethoxysilane and mixtures thereof.

14. The composition of claim 11 wherein the stabilizing agent (b) is selected from the group consisting of is selected from the group consisting of ethanol, 1-propanol, 2-propanol, 2-methyl-1-propanol, 2-methyl-2-propanol, 1-butanol, 2-butanol, 2-methyl-1-butanol, 2-methyl-2-butanol, 2,2-dimethyl-1-propanol, 1-pentanol, 2-pentanol, 4-methyl-2-pentanol, propylene glycol, 1,3-butanediol, 1,4-butane diol, 2-methyl-1,3-propanediol, 2-methyl-2,4-pentanediol, tetraethylene glycol, poly(ethylene glycol), dipropylene glycol, tripropylene glycol, poly(propylene glycol), 1,5-pentanediol, esterdiol 204,2,2,4-trimethylpentanediol, 2-ethyl-1,3-hexanediol, glycerol, trimethyolpropane, trimethylolpropane allyl ether, glycerol ethoxylate, glycerol ethoxylate-co-propoxylate triol, glycerol propoxylate, pentaerythritol, 1-methoxy-2-propanol (propylene glycol methyl ether), 1-ethoxy-2-propanol, 1-propoxy-2-propanol, 1-butoxy-2-propanol, 2-butoxyethanol, di(propylene glycol) butyl ether, poly(propylene glycol) monobutyl ether, di(propylene glycol) dimethylether, methyl acetate, ethyl acetate, ethyl lactate, 2-methoxyethyl acetate, 2-butoxyethyl acetate, propylene glycol methyl ether acetate, propylene glycol ethyl ether acetate, acetone, diacetone alcohol, MeO(EO)$_{7.5}$—CH$_2$—CH$_2$—CH$_2$—Si—(OMe)$_3$ wherein MeO is methoxy and (EO) is an oxyethylene group; and combinations thereof.

15. A stable composition consisting essentially of:
  a) an aqueous solution of partial and/or complete condensate of
  ureidosilane of the general formula (I):

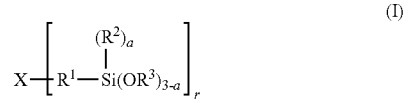

(I)

wherein
  $R^1$ is a linear, branched or cyclic divalent organic group of 1 to 12 carbon atoms forming a stable bridge between ureido group X and the silyl group;
  each occurrence of $R^2$ independently is alkyl, aryl, or aralkyl group of from 1 to 16 carbon atoms;
  each occurrence of $R^3$ independently is hydrogen, acetyl, alkyl, or alkoxy-substituted alkyl group having from 1 to 16 carbon atoms;
  X is an ureido group of valence r selected from the group consisting of —NR(C=O)NR$_2$, —NR(C=O)NR—, (—)$_2$N(C(=O)NR$_2$, (—)$_2$N(C(=O)NR— and (—)$_2$N(C(=O)N(—)$_2$, wherein R is independently selected from the group consisting of hydrogen, alkyl group having from 1 to 6 carbon atoms, cycloalkyl group, alkenyl group having from 1 to 6 carbon atoms, arylene group and alkarylene group;
  r is an integer of from 1 to 4; and
  a is an integer of from 0 to 2, in the amount of from 0.01 to 80 weight percent and having no hazardous air pollutant in excess of 0.1 weight percent of the composition, wherein said aqueous solution is not stable and having visible precipitate or gel within a period of time from 1 week to 18 months;
  b) a stabilizing agent selected from the group consisting of alcohols, glycols, triol, polyols, glycol ethers, esters, ketones, pyrolidones and polyether silanes in the amount of from 1 to 50 weight percent;
  c) a colloidal cerium oxide in the amount of from 0.001 to 36 weight percent; and
  d) an adjuvant in the amount of from 0.1 to 10 weight percent of the general formula (IV):

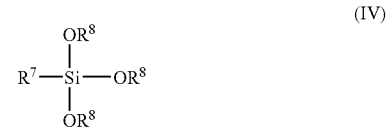

(IV)

wherein $R^7$ is a monovalent hydrocarbon group having from 1 to 10 carbon atoms or $OR^8$, and each $R^8$ is independently chosen from $C_1$-$C_4$ alkyl, wherein the stabilizing agent (b) stabilizes aqueous solution (a) to produce a stable composition which does not contain any visible precipitation or gelation for a period of time from 1 week to 18 months and wherein said weight percent amounts are based on the total weight of the composition.

16. A method for treating a metal surface to form a conversion or passivation coating thereon which comprises contacting said metal surface with a composition consisting essentially of:
  a) an aqueous solution of partial and/or complete condensate of
  ureidosilane of the general formula (I):

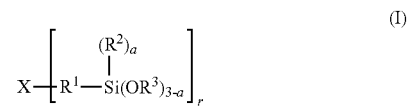

(I)

wherein
  $R^1$ is a linear, branched or cyclic divalent organic group of 1 to 12 carbon atoms forming a stable bridge between ureido group X and the silyl group;
  each occurrence of $R^2$ independently is alkyl, aryl, or aralkyl group of from 1 to 16 carbon atoms;
  each occurrence of $R^3$ independently is hydrogen, acetyl, alkyl, or alkoxy-substituted alkyl group having from 1 to 16 carbon atoms;
  X is an ureido group of valence r selected from the group consisting of —NR(C=O)NR$^2$, —NR(C=O)NR—, (—)$_2$N(C(=O)NR$^2$, (—)$_2$N(C(=O)NR— and (—)$_2$N(C(=O)N(—)$_2$, wherein R is independently selected from the group consisting of hydrogen, alkyl group having from 1 to 6 carbon atoms, cycloalkyl group, alkenyl group having from 1 to 6 carbon atoms, arylene group and alkarylene group;
  r is an integer of from 1 to 4; and
  a is an integer of from 0 to 2, in the amount of from 0.01 to 80 weight percent and having no hazardous air pollutant in excess of 0.1 weight percent of the composition, wherein said aqueous solution is not stable and having visible precipitate or gel within a period of time from 1 week to 18 months;
  b) a stabilizing agent selected from the group consisting of alcohols, glycols, triol, polyols, glycol ethers, esters, ketones, pyrolidones and polyether silanes in the amount of from 1 to 50 weight percent;

and c) a colloidal cerium oxide in the amount of from 0.001 to 36 weight percent, wherein the stabilizing agent (b) stabilizes aqueous solution (a) to produce a stable composition which does not contain any visible precipitation or gelation for a period of time from 1 week to 18 months and wherein said weight percent amounts are based on the total weight of the composition.

17. The method of claim 16 wherein the ureidosilane (a) is gamma-ureidopropyltrimethoxysilane or gamma-ureidopropyltriethoxysilane.

18. The method of claim 16 wherein the stabilizing agent (b) is at least one member selected from the group consisting of alcohols, glycols, triols, polyols and glycol ethers.

19. The method of claim 18 wherein the stabilizing agent is a polyether silane having the general formula $R^6O(EO)_m$—$[CH_2]_n$—Si—$(OR)_3$ where m is 1 to about 20, n is 1 to 12 and $R^6$ is a linear, branched or cyclic organic group of 1 to about 16 carbon atoms and EO is an oxyethylene group.

20. The method of claim 19 wherein the polyether silane is at least one of the general formulae $R^6O(EO)_{7.5}$—$CH_2$—$CH_2$—$CH_2$—Si—$(OMe)_3$, or $R^6O(EO)_3$—$CH_2$—$CH_2$—$CH_2$—Si—$(OMe)_3$ where $R^6$ is methyl and (OMe) is a methoxy group.

21. The method of claim 16 wherein said composition is substantially free of volatile organic compounds.

22. The method of claim 16 wherein said conversion or passivation coating is of greater than about 0.5 mg per square foot on said surface.

23. The composition of claim 1 wherein the composition has volatile organic compound in amounts of less than 1 weight percent, based on the total weight of the composition.

* * * * *